UNITED STATES PATENT OFFICE.

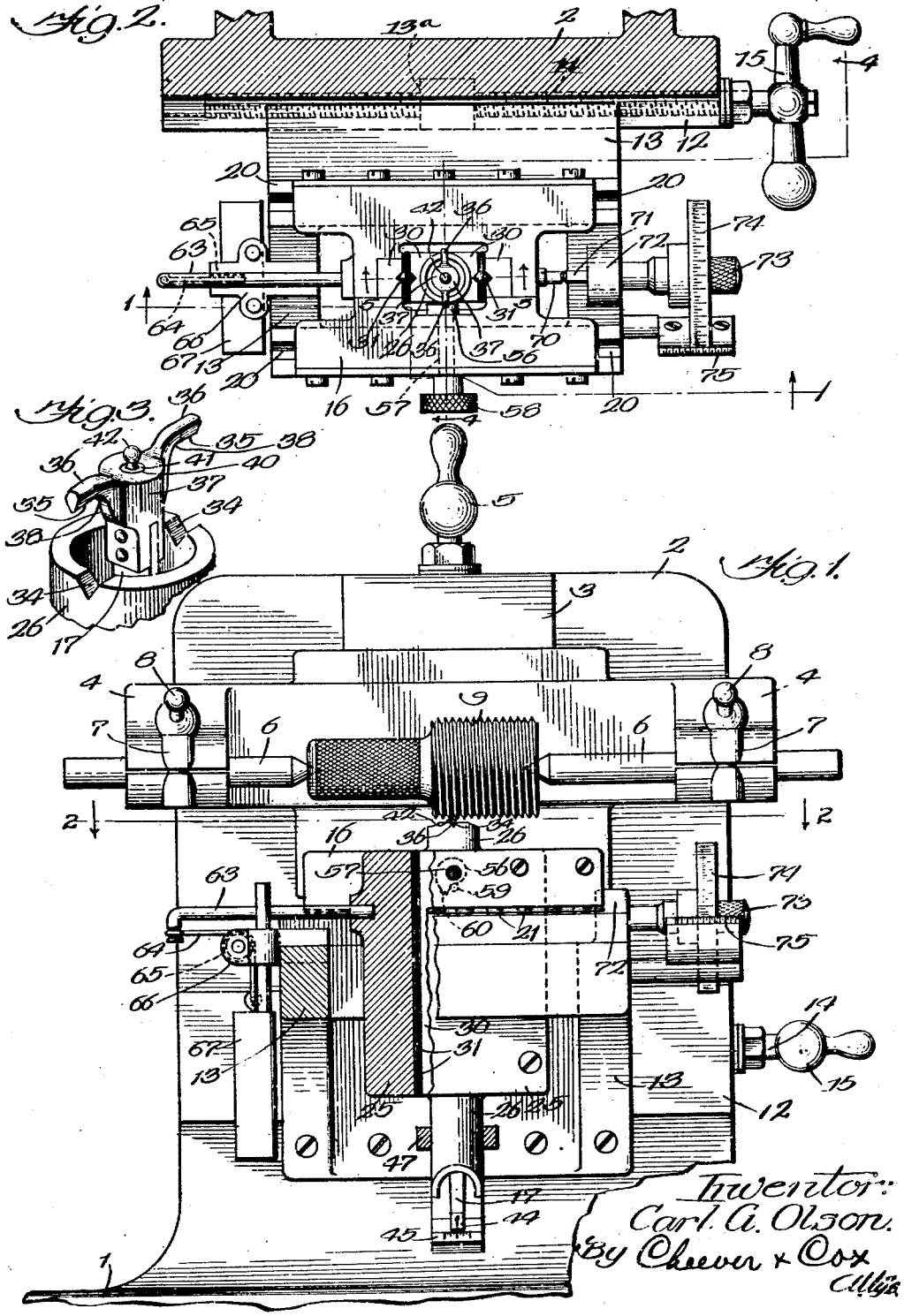

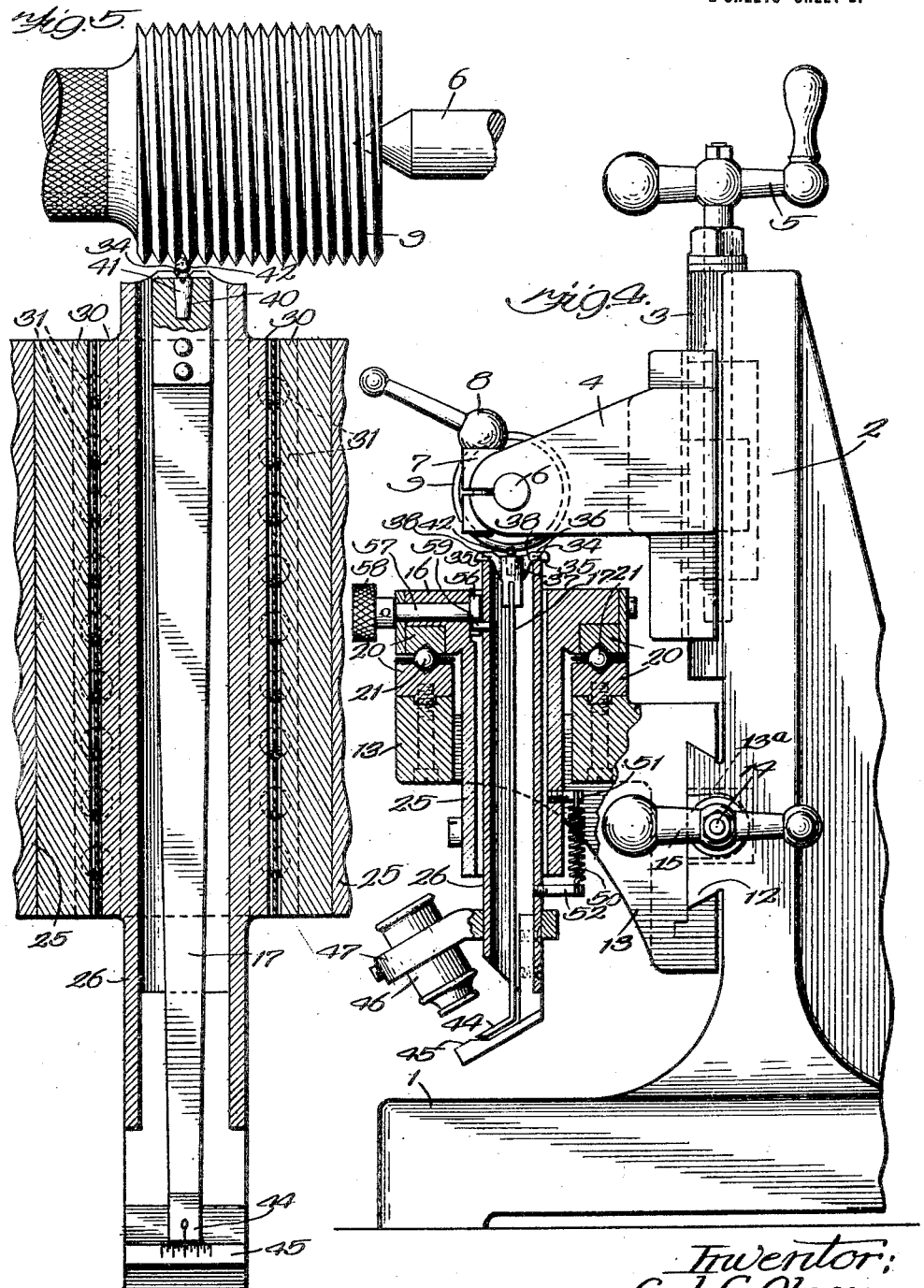

CARL G. OLSON, OF CHICAGO, ILLINOIS, ASSIGNOR TO ILLINOIS TOOL WORKS, OF CHICAGO, ILLINOIS, A CORPORATION OF ILLINOIS.

TESTING-MACHINE.

1,357,813.   Specification of Letters Patent.   Patented Nov. 2, 1920.

Application filed April 22, 1918. Serial No. 230,018.

*To all whom it may concern:*

Be it known that I, CARL G. OLSON, a citizen of the United States, residing at Chicago, in the county of Cook and State of Illinois, have invented a certain new and useful Improvement in Testing-Machines, of which the following is a specification.

My invention relates to testing machines, and is especially adapted to measure the lead in thread gages and screw gages. The general object of the invention is to provide a machine of this character having few and simple parts, and capable of measuring the work accurately. Another object is to provide a machine which will be easily manipulated and which will also have a wide range of capacity. These general objects are accomplished by devices and combinations of devices which will be more readily understood by reference to the drawings and the following description and claims.

In the drawings,—

Figure 1 is a front elevation of the machine partly in vertical section, the plane of section being indicated by the line 1—1 of Fig. 2.

Fig. 2 is a plan section on the line 2—2, Fig. 1.

Fig. 3 is a fragmentary perspective, showing the upper end of the testing lever and its bearings.

Fig. 4 is an end view of the machine, partly in section on the line 4—4, Fig. 2.

Fig. 5 is a vertical section, showing more particularly the testing lever and its support in its relation to the "work" or object to be tested. The plane of section is indicated by the line 5—5, Fig. 2.

Similar numerals refer to similar parts throughout the several views.

In the form selected to illustrate the invention, the main frame consists chiefly of a base 1 from which rises a column or standard 2, having vertical ways 3 for guiding the work holder 4. This work holder or bracket may be vertically adjusted by means of the hand screw 5. It is provided with centers 6, 6 held in clamps 7, 7 tightened by means of the hand screws 8. These centers are thus adapted to hold the work 9. The work is here shown as being externally threaded with a standard V thread. Beneath the work holder or bracket the standard 2 is provided with cross-ways 12 for supporting and guiding a bracket 13. A feed screw 14 operated by a crank handle 15 is mounted in the standard 2 and works in the nut 13ª which forms part of the bracket 13. The parts are so constructed that when the hand crank is rotated the nut and hence the bracket will slide in one direction or the other upon the cross-ways 12, the direction of travel depending upon the direction in which the crank is rotated. Bracket 13 supports the carriage 16 which carries the testing lever 17. In order that the carriage may travel easily, it is desirable to provide companion ball races 20, one located on the top of bracket 13 and the other on the bottom of carriage 16 for receiving anti-friction balls 21. It will thus be seen that the carriage is mounted upon ball bearings arranged to permit the carriage to travel in a direction parallel to the axis of the work.

The carriage has a depending housing 25 which incloses the housing 26 containing the testing lever previously mentioned. The inner housing is vertically movable with respect to the outer one, and to reduce friction the parts are provided with vertically arranged ball races 30, as shown in Figs. 1 and 5. These contain anti-friction balls 31. These bearings are made long enough to insure accurate positioning of the inner housing and practically eliminate lost motion or side lash. In the form illustrated, the inner housing 26 extends both above and below the carriage, and at the upper end has two notches 34 Figs. 3 and 4, which form bearings for the knife edges 35 formed on the bottom of the arms 36 which extend laterally from the block 37, forming the top of the lever. Shoulders 38 formed at the inner end of the arms prevent the lever from becoming laterally displaced.

A socket 40, best shown in Figs. 3 and 5, is formed in the top of block 37, and in this is seated a head piece 41 having a rounded head 42 adapted to enter between the threads of the work. The head piece may be removed by simply lifting it out of the socket, and this makes it possible to always select a head piece having a head of such size that it will contact the threads substantially at the pitch circle. By reference to Figs. 3 and 4, it will be seen that in this, the preferred construction, the arms 36 sweep upward as well as outward, with the result that the center of the head 42 is but slightly above the knife edges 35. This makes the testing lever very sensitive, as the portion of the lever below the knife edges is quite long and a very slight angular movement of the head will produce a greatly enlarged movement at the lower end of the testing lever. At its lower end, said lever has a pointer or indicator 44 which sweeps across a scale 45 located at the lower end of the housing 26. For convenience, a magnifying glass 46 is mounted in the bracket 47, projecting from the front of the housing 26 to enable the user to read the indicator with greater speed and accuracy.

The housing 26 is constantly urged upward toward the work by a tension spring 50, Fig. 4, the upper end of which is secured to the pin 51 projecting from the housing 25. The lower end is secured to the pin 52 projecting from the inner housing 26. This tends to hold the ball or testing head 42 in engagement with the thread of the work. The housing and its testing lever are depressed or retracted from the work by means of a cam 56 secured to the inner end of a shaft 57 arranged horizontally in the carriage and provided with a knurled head 58 by which the user may rotate it. Said cam engages a pin 59 projecting from the side of the housing 26. This cam is here shown as being substantially of the type known as a snail cam, but terminating at the top of the rise in a dwell 60, as best shown in Fig. 1. When the cam is rotated until this dwell engages the pin 59 the cam will hold the housing and its testing lever in lowermost position and yet the pressure of the pin will not tend to rotate the cam. Thus the lever may be regarded as being locked in non-acting or retracted position, where it will permit the head 42 to clear the work when the carriage travels.

Projecting toward the left from the carriage 16 is a rod 63, at the outer end of which a cord 64 is fastened, as best shown in Figs. 1 and 2. This cord passes over an idler sheave 65 mounted in the stationary bracket 66. A weight 67 is fastened to the depending end of the cord, with the result that the carriage is constantly urged toward the right. At the right end the carriage has a rod 70 which is arranged horizontally in alinement with the micrometer screw 71. This screws in the internally threaded bracket 72 formed on the main frame of the machine. The screw is provided with a knurled head 73 for rotating it, and a wheel or barrel 74, the periphery whereof is graduated, and coöperates with the stationary reading line or indicator 75. The arrangement is such that the carriage always tends to move toward the micrometer screw and by rotating this screw one way or the other the position of the carriage may be controlled. The graduations on the barrel 74 enable the user to read the amount of movement of the carriage very accurately. For example, it is quite practical to use a micrometer screw having ten threads to the inch and a graduated barrel having one thousand graduations marked upon its periphery. This enables the user to read within one-ten-thousandth of an inch.

In operation, let it be assumed that the work 9 is in position and the parts assembled as shown in the drawings. The user first positions the carriage in such manner that the indicating line at the lower end of the testing lever will be at the zero position on the scale 45 when the head 42 is in contact with two adjacent threads, as shown in Fig. 5. He then rotates the shaft 57 and causes the cam 56 to depress the housing 26 and cause the ball 42 to clear the work. He then rotates the micrometer screw to bring the ball opposite to the next pair of threads, whereupon he rotates the shaft 57 in a direction to release the housing 26. This permits the spring 50 to bring the head 42 into engagement with the threads. The micrometer screw is then adjusted until the reading line of the testing lever is again brought to zero position on the scale 45. By then taking a reading on the micrometer barrel 74 the operator may determine very accurately the pitch of the thread on the work. An operator familiar with the use of this general kind of apparatus will usually be able to read within one or less than one ten-thousandth of an inch.

It will thus be seen that the manipulation of the machine is a very simple matter, and yet the measurements on the work may be read with great accuracy. As practically all of the weight of the testing lever is below the knife edges, the tendency is for the lever to hang vertically like a pendulum. Hence, there is practically no overbalancing tendency;—that is to say, the lever indicates minutely its position, and in that sense is extremely sensitive, and yet, due to the distance of the center of gravity below the fulcrum, the lever is very stable. In many instruments of precision, as for example in an apothecary's balance, the greater the sensitiveness of the instrument the less is its stability. In my machine, however, great sensitiveness is combined with great stability.

Having thus described my invention, what I claim as new and desire to secure by Letters Patent, is:—

1. A machine for measuring the lead of threaded objects, said machine having a support for the object to be measured, a measuring lever, and means for producing relative travel between the lever fulcrum and the object to be measured for testing the successive threads, said lever having a head for engaging the thread and an indicator having a pointer for indicating aberration, said head being close to the lever fulcrum and the pointer being remote from the lever fulcrum, whereby the aberration, if any, in the thread will be greatly magnified.

2. A thread testing machine having a support for the object whose thread is to be tested, a carriage traveling relatively to said object and parallel to the axis thereof, and a pendulum-like lever carried by said carriage and having a head on its upper end near the fulcrum for engaging the threads of said object and having an indicator at its lower end, said lever hanging vertically and being pivoted near its upper end, whereby the aberration, if any, is magnified at the indicator end.

3. A thread testing machine having a support for the object to be tested, a traveling carriage, a pendulum-like lever suspended near its upper end upon said carriage, said lever having a head at its upper end for engaging the thread and having an indicator at the lower end, means for causing the carriage to travel to bring the head from one thread to the next, and means for retracting the head to permit it to pass from one thread to the next.

4. A thread testing machine having a work support, an indicator lever having a head for engaging the threads of the work to test them, a lever support, the work support and the lever support being adapted for relative movement in a direction parallel to the axis of the work, and a fulcrum element mounted on the lever support and adapted to move toward and from the work for bringing the head of the lever into and out of engagement with the threads thereof, the lever having two laterally extending arms having knife edges bearing upon said fulcrum element, said head being located between the knife edges and close to the line of said knife edges whereby the movement of said lever is magnified.

5. A thread testing machine having a support for the work, a testing lever having a head for engaging the thread of the work for testing it, a lever support, a fulcrum element for supporting said lever, said fulcrum element being mounted on the lever support, the work support and the lever support being relatively movable parallel to the axis of the work, and movable transversely to the axis of the work for bringing the head of the lever into and out of engagement with the threads to be tested, means for urging the fulcrum element toward the work, and a rotary cam for retracting said fulcrum element, said cam having a dwell at one part of its acting surface, whereby the fulcrum element may be held in retracted position without tending to rotate the cam.

6. A testing machine having a work support, a pendulum-like testing lever having a head for engaging the work, a housing for said lever, said work support and housing support being relatively movable in a direction parallel to the axis of the work, and movable in a direction transverse to the axis of the work for bringing the head of the lever into and out of contact with the work, the lever having knife edges bearing in grooves in the housing, a spring adapted to urge the housing toward the work, and a cam for retracting the housing.

7. In a machine of the class described, a main frame adapted to hold the work, a traveling carriage mounted on said main frame, and a testing lever mounted on said carriage, the carriage having bearings for said lever and the lever being suspended vertically upon them, the lever having a block near its upper end provided with laterally extending arms having knife edges resting in said bearings and said block having a head located in a depression between said arms and close to the line of the knife edges, whereby the movement of the distant end of the lever is magnified.

In witness whereof, I have hereunto subscribed my name.

CARL G. OLSON.